US007564500B2

(12) United States Patent
Handa

(10) Patent No.: US 7,564,500 B2

(45) Date of Patent: Jul. 21, 2009

(54) ELECTRONIC APPARATUS HAVING MEMORY MEDIUM ATTACHMENT PART

(75) Inventor: Masaki Handa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 466 days.

(21) Appl. No.: 11/414,010

(22) Filed: Apr. 28, 2006

(65) Prior Publication Data

US 2006/0256211 A1 Nov. 16, 2006

(30) Foreign Application Priority Data

May 13, 2005 (JP) ............................ 2005-141868

(51) Int. Cl.
*H04N 5/225* (2006.01)

(52) U.S. Cl. ...................................... 348/374; 348/372

(58) Field of Classification Search ......... 348/372–376; 396/535, 539–541
See application file for complete search history.

(56) References Cited

U.S. PATENT DOCUMENTS 3,511,146 A * 5/1970 Finelli et al. ................ 396/539
7,110,039 B2 * 9/2006 Matsuzawa ................. 348/372

FOREIGN PATENT DOCUMENTS

JP 2002-094900 3/2002
JP 2003-186099 7/2003
JP 2004-208028 7/2004

* cited by examiner

*Primary Examiner*—Timothy J Henn
(74) *Attorney, Agent, or Firm*—Cowan, Liebowitz & Latman, P.C.

(57) ABSTRACT

An electronic apparatus is disclosed, which attachment/removal of a memory medium can be facilitated without increasing the size of the apparatus body. The electronic apparatus comprises an apparatus body which accommodates first and second members each having a curved surface portion so that the central axes of curvature of the curved surface portions extend parallel to each other, and a medium attachment part to which a memory medium is removably attached. In a state in which the two members are accommodated inside the apparatus body, the medium attachment part is placed between the two members, and an attachment/removal space through which the memory medium is attached to and removed from the medium attachment part is formed so as to widen towards the outside of the apparatus body along the curved surface portions of the two members.

9 Claims, 8 Drawing Sheets

ELECTRONIC APPARATUS HAVING MEMORY MEDIUM ATTACHMENT PART

BACKGROUND OF THE INVENTION

The present invention relates to electronic apparatuses such as digital cameras, which have a medium attachment part to which a memory medium such as an external memory is attached.

FIG. 9 shows the top view of the internal structure of a grip portion (a part which is held by a photographer) of conventional digital cameras (see Japanese Patent Application Laid-Open No. 2004-208028).

In this figure, 100 denotes the grip portion of the camera body. Four members having a cylindrical shape (hereinafter, referred to as cylindrical members) 110 to 113 such as batteries are accommodated in this grip portion 100.

103 denotes a memory socket (memory slot) to which an external memory 104 is attached. The external memory 104 is a card-type memory medium that records information of the images acquired by an image-pickup device, not shown in the figure.

105 denotes a substrate that is provided in the memory socket 103, and supports a connector (not shown in the figure) connected to the external memory 104. The external memory 104 is attached to the memory socket 103 by being pushed from the side of the grip portion 100 with a finger 106.

A cover member 102 that covers the insert slot of the memory socket 103 is swingablly attached to the grip portion 100 via a hinge 102*a*, the cover member 102 moving to open and shut the opening of the insert slot. At the edge of the cover member 102, a latch hook 102*b* is formed which engages with the inside of the grip portion 100 to lock the cover member shut.

The cylindrical members 110 to 113 and the socket 103 are laid out so that the grip portion 100, consequently the camera body, is minimized, and also that the external memory can be attached and removed easily.

Conventionally, when the cylindrical members 110 to 113 (especially batteries) and the memory socket 103 shown in FIG. 9 were placed inside the grip portion 100, it was usual that the four cylindrical members 110 to 113 were placed all together in the grip portion and the memory socket 103 was placed in the back area of the four cylindrical members 110 to 113 (the top area in the figure), due to the arrangement of electrodes and wiring. Other layouts were hardly examined. This meant that there were very few alternatives concerning the layout of the cylindrical members 110 to 113 and the memory socket 103, and accordingly less flexibility with the design of the camera body.

BRIEF SUMMARY OF THE INVENTION

One object of the present invention is to provide an electronic apparatus that allows easier attachment and removal of the memory medium without increasing the size of the apparatus body, while enhancing the flexibility with the design of the apparatus body, by adopting a new layout of a medium attachment part and members having curved surface portions inside the apparatus body.

As one aspect of the present invention, an electronic apparatus comprises an apparatus body which accommodates first and second members each having a curved surface portion so that the central axes of curvature of the curved surface portions extend parallel to each other, and a medium attachment part to which a memory medium is removably attached. In a state in which the first and second members are accommodated inside the apparatus body, the medium attachment part is placed between the first and second members, and a spatial area through which the memory medium is attached to and removed from the medium attachment part is formed so as to widen towards the outside of the apparatus body along the curved surface portions of the first and second members.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

FIGS. 1 to 4 show the structure of a digital single lens reflex camera that is Embodiment 1 of the present invention.

Figure 2:
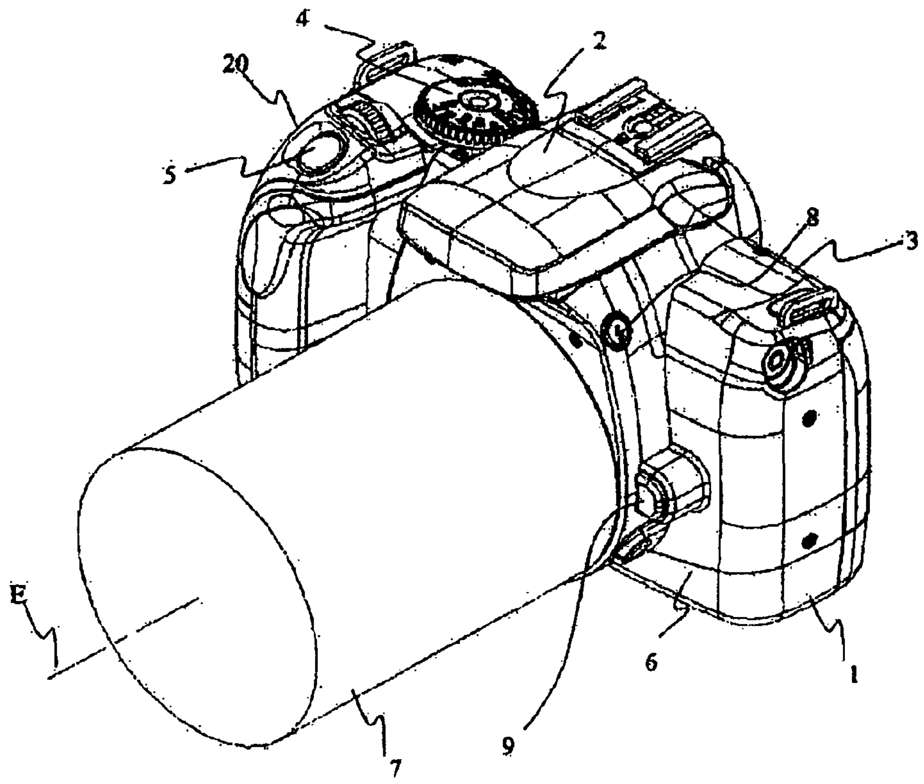
FIG. 2 is an external perspective view of the camera of Embodiment 1.

Firstly, FIG. 2 is an external view of the camera. In FIG. 2, 1 denotes a camera body, and on its front face, an interchangeable lens 7 is mounted via a mount, not shown in the figure.

2 denotes a flash unit which can pop up from the camera body 1. The figure shows the flash unit 2 located at a popped down position. 3 denotes the top part of the exterior member, and 4 denotes a dial for changing image-taking mode.

The camera body 1 includes a grip portion 20 which is formed on the left side of the camera body 1 when seen from the front. The grip portion 20 is a portion where the photographer holds when taking images. On top of this grip portion 20, a release button 5 is provided. 6 denotes the front exterior member.

E denotes an optical axis of the interchangeable lens 7 (hereinafter, referred to as an image-taking optical axis), and 8 denotes a popup button for releasing the lock of the flash unit 2 at the down position to cause the flash unit 2 to pop up.

9 denotes a lock-release button for releasing the attachment lock of the interchangeable lens 7.

Figure 1:
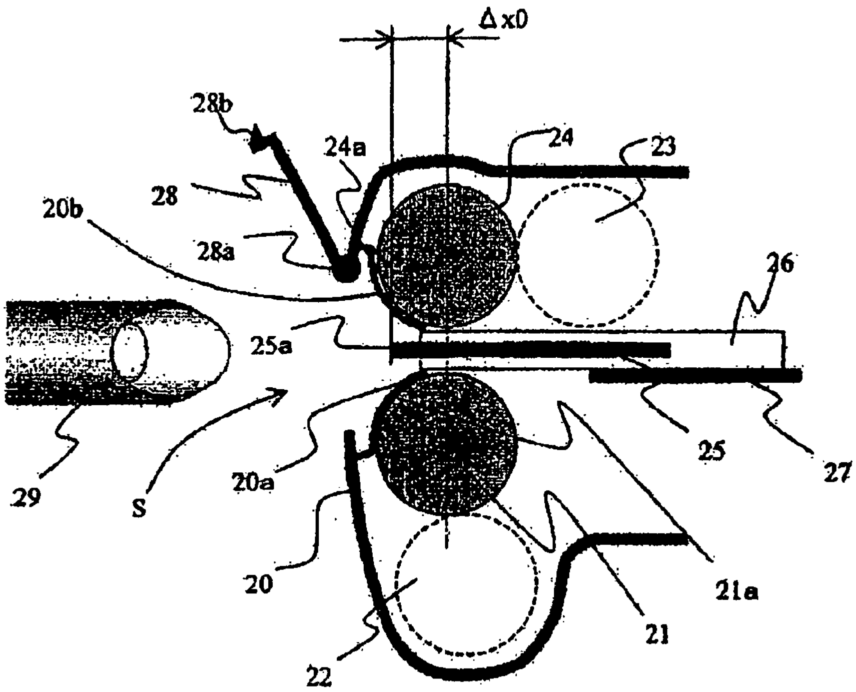
FIG. 1 is a top view showing the cross section of a grip portion of a camera that is Embodiment 1 of the present invention.

FIG. 1 is a top sectional view schematically showing the inside of the grip portion 20 in this embodiment. In the grip portion 20 shown in FIG. 1, four main batteries 21 to 24 and a memory socket 26 (or a memory slot, that is, a medium attachment part) which allows attachment and removal of the external memory 25 are placed. The memory socket 26 has a slot into which the external memory 25 is inserted. A card type memory such as a semiconductor memory can be used as the external memory 25.

The four main batteries 21 to 24 have cylindrical-shapes with the substantially same diameter, and are placed so that the central axes of curvature of their cylindrical surfaces, which are their outer circumferential surfaces, extend parallel to each other in the vertical direction of the grip portion 20. The central axes of curvature are axes perpendicular to the paper of the figure, and shown by o and o' in the figure. These main batteries 21 to 24 can be loaded in or taken out from the grip portion 20, from the bottom of the grip portion 20, the bottom not being shown in the figure.

27 denotes a substrate equipped with a connector that is not shown in the figure. The connector is electrically connected to the external memory 25 attached to the memory socket 26. This connector is connected via the substrate 27 to an image processing circuit or a camera CPU, not shown in the figure.

A memory cover 28 for covering a spatial area through which the external memory 25 is attached to and removed from the memory socket 26 (hereinafter, the spatial area is referred to as the memory attachment/removal space S) is swingablly attached to the grip portion 20 via a hinge 28*a*. The memory cover 28 is moved to open and shut the opening of the memory attachment/removal space S. At the edge of the memory cover 28, a latch hook 28*b*, which engages with the inside of the grip portion 20 to lock the memory cover 28 in the shut state, is formed.

In this embodiment, of the four main batteries 21 to 24, the first battery 21 (first member) and the fourth battery 24 (second member) are placed apart from each other in the front and back direction (on the lower side and the upper side in FIG. 1) in the grip portion 20, and the memory socket 26 is placed between the first and fourth batteries 21 and 24 so as to extend in the horizontal direction of the grip portion 20. The second battery 22 is placed along the curved surface of the front end of the grip portion 20 in front of the first battery 21.

The third battery 23 is placed at the right side of the fourth battery 24, which is the side closer to the image-taking optical axis E shown in FIG. 2.

Further, in the grip portion 20, partitions 20*a* and 20*b* are formed so as to extend along quarter cylindrical surfaces 21*a* and 24*a* of the first and fourth batteries 21 and 24, the surfaces 21*a* and 24*a* facing each other in an area close to the left-outer side of the grip portion 20. These partitions 20*a* and 20*b* extend in an arc shape so that the interspace therebetween widens from the insert slot of the memory socket 26 to the exterior surface of the grip portion 20. Thereby, the memory attachment/removal space S is formed which has a fan-like shape whose width widens from the insert slot of the memory socket 26 to the exterior surface of the grip portion 20.

With the above structure, the external memory 25 is attached to the memory socket 26 through the memory attachment/removal space S by being pushed by a photographer's finger 29 from the left side of the grip portion 20.

FIG. 1 shows the position of the external memory 25 attached to the memory socket 26. In this state, a part of the external memory 25 protrudes from the insert slot of the memory socket 26 into the memory attachment/removal space S. In addition, the protruding edge 25*a* of the external memory 25 is located at the position closer to the left-outer side of the grip portion 20 by a length of Δxo than a line drawn between the two central axes of curvature o and o' of the first and fourth batteries 21 and 24 loaded in the grip portion 20 (the line is shown by the chain line in the figure. This makes the attachment and removal of the external memory 25 by the finger 29 easier, as will be mentioned later.

Figure 3A:
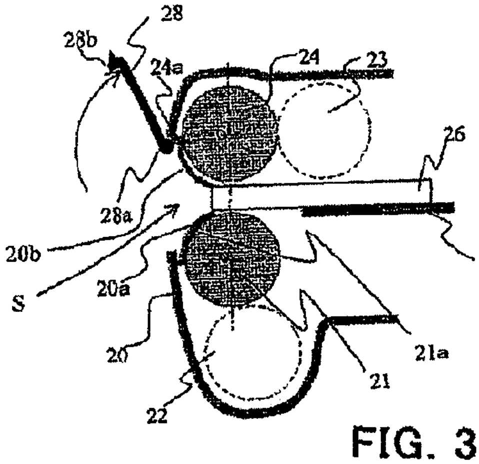
FIGS. 3A to 3D are top views showing the cross section of the grip portion when an operation to attach an external memory to the camera is done in Embodiment 1.
Figure 3B:
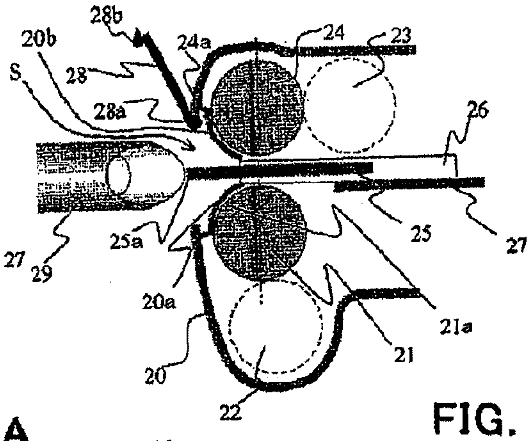
Figure 3C:
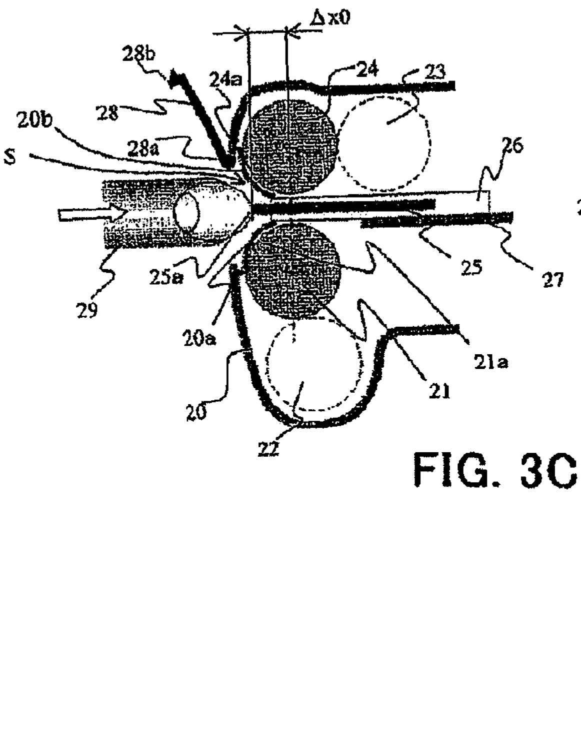

FIGS. 3A to 3D show the operation of attaching the external memory 25 in this embodiment. To attach the external memory 25, the engagement of the latch hook 28*b* of the memory cover 28 should be released to open the memory cover 28 and expose the memory attachment/removal space S (FIG. 3A). Then, the external memory 25 should be inserted through the memory attachment/removal space S into the memory socket 26 (FIG. 3B). Next, the edge of the external memory 25 should be pushed towards the memory socket 26 (FIG. 3C) against the bias power of a spring (not shown in the figure) placed inside the memory socket 26, and the external memory 25 should be pressed into the memory socket 26 until it is locked (FIG. 3D) by a locking mechanism, not shown in the figure, formed in the memory socket 26. Lastly, the memory cover 28 should be closed to finish the attachment.

Figure 3D:
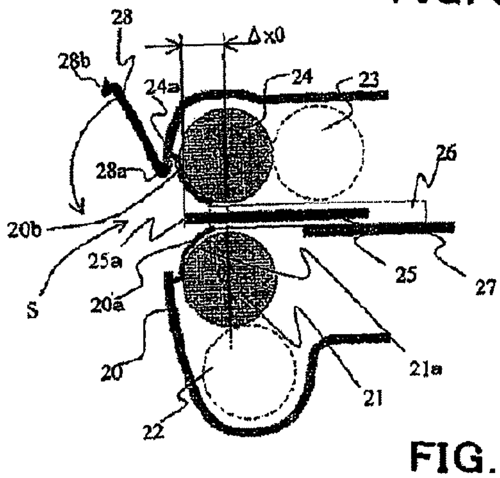

In FIG. 3D the external memory 25 is locked by the locking mechanism and the edge 25*a* of the external memory 25 protrudes by a length of Δxo into the memory attachment/removal space S from the line drawn between the two central axes of curvature o and o' of the first and fourth batteries 21 and 24 loaded in the grip portion 20 (the line is shown by the chain line in the figure).

Figure 4A:
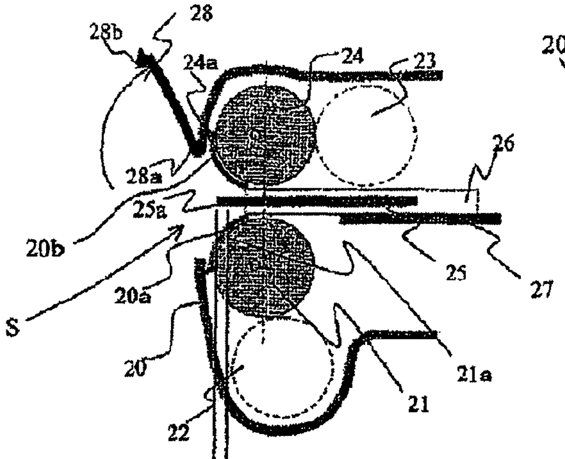
FIG. 4 is a top view showing the cross section of the grip portion when an operation to remove the external memory from the camera is done in Embodiment 1.
Figure 4B:
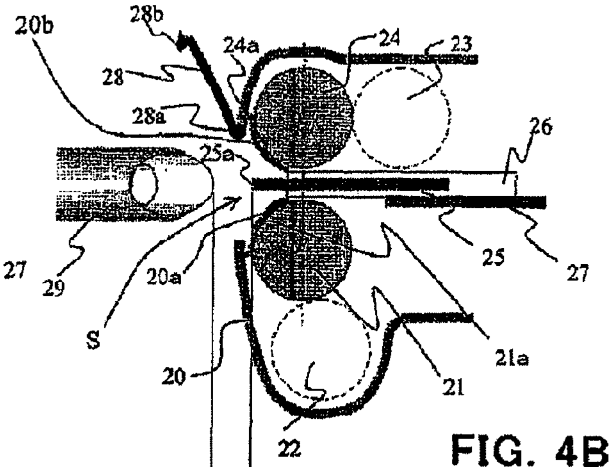
Figure 4C:
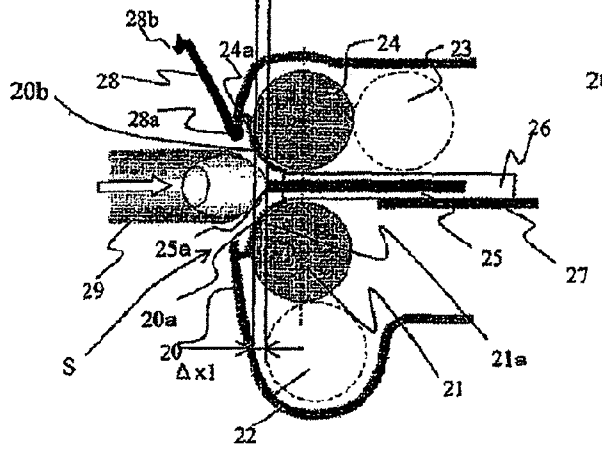
Figure 4D:
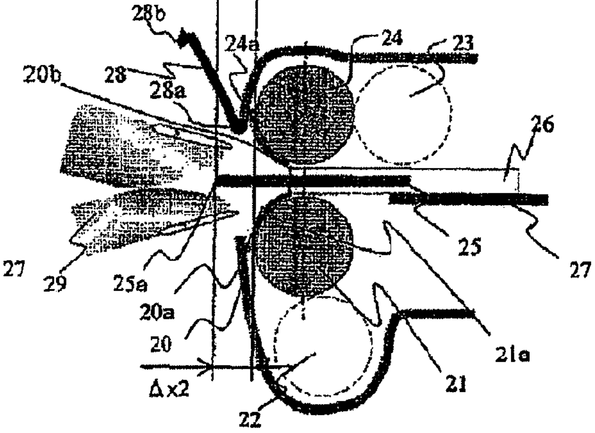

FIGS. 4A to 4D show the operation of removing the external memory 25 in this embodiment. To remove the external memory 25, the engagement between the latch hook 28*b* of the memory cover 28 and the grip portion should be released first, and then the memory cover 28 should be opened to expose the edge 25*a* of the external memory 25 (FIG. 4A). Next, the finger 29 should be put in the memory attachment/removal space S (FIG. 4B), and the edge 25*a* of the external memory 25 protruding into the memory attachment/removal space S should be pressed inward by a length of Δx1 (FIG. 4C). By doing so, the lock by the locking mechanism in the memory socket 26 is released, and the external memory 25 is pushed left-outward by a length of Δx2, by the bias power of the spring (FIG. 4D). After this, the external memory 25 can be taken out from the grip portion 20 (or camera body 1), with the finger 29 pulling the pushed-out part of the external memory 25.

In attaching and removing the external memory 25 to and from the memory socket 26, the finger 29 can enter the memory attachment/removal space S comfortably (without interference of the partitions 20*a* and 20*b*) because the partitions 20*a* and 20*b* are formed so that they extend along the quarter cylindrical surfaces 21*a* and 24*a* of the first and fourth. batteries 21 and 24 in an arc shape and the interspace therebetween widens towards the left-outer side of the grip portion 20. Therefore, the attachment and removal of the external memory 25 is easy.

In this embodiment, the memory socket 26 is placed between the first battery 21 and the fourth battery 24, but this does not increase the size of the grip portion 20 nor of the camera body 1. In other words, the attachment and removal of the external memory 25 can be facilitated without preventing the minimization of the camera body 1.

Though batteries are used as the members having curved surface portions in this embodiment, any other members having curved surface portions and being placed inside the camera body can be used, which are actuators such as plungers and motors, electric elements such as condensers, or the like.

Embodiment 2

Figure 5:
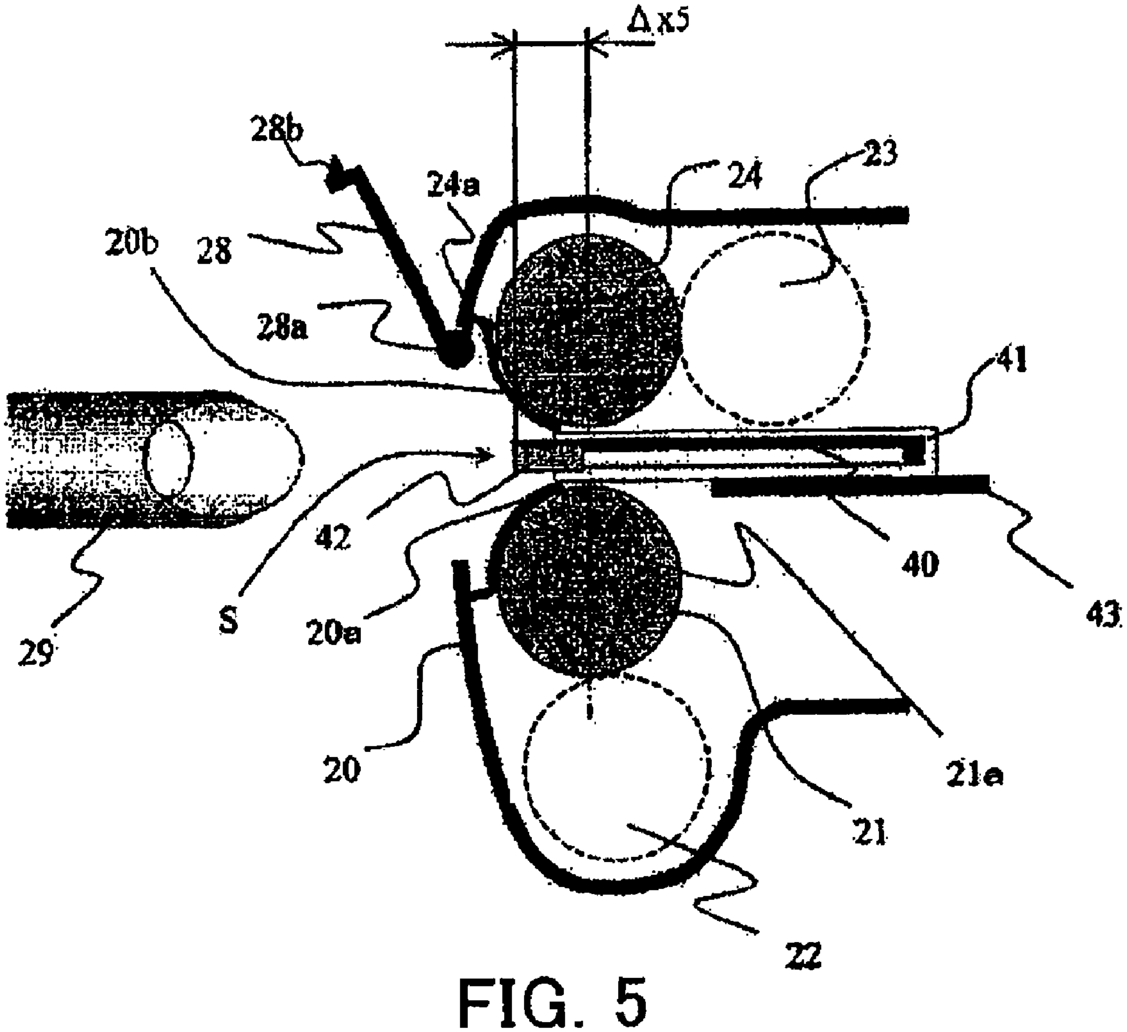
FIG. 5 is a top view showing the cross section of a grip portion of a camera that is Embodiment 2 of the present invention.

FIG. 5 is a top sectional view showing the structure of a grip portion of a digital single lens reflex camera that is Embodiment 2 of the present invention.

In the grip portion 20 shown in FIG. 5, four main batteries 21 to 24 and a memory socket (medium attachment part) 41 which allows attachment/removal of an external memory 40 are placed. The four main batteries 21 to 24 have cylindrical-shapes with the substantially same diameter, and are placed so that the central axes of curvature of their cylindrical surfaces, which are their outer circumferential surfaces, extend parallel to each other in the vertical direction of the grip portion 20. The central axes of curvature are perpendicular to the paper of the figure, and shown by o and o' in the figure. These main batteries 21 to 24 can be loaded in or taken out from the grip portion 20, from the bottom of the grip portion 20, not shown in the figure. As the external memory 40, a card type memory such as a semiconductor memory can be used.

43 denotes a substrate equipped with a connector that is not shown in the figure. The connector is electrically connected to the external memory 40 attached to the memory socket 41. This connector is connected via the substrate 43 to an image processing circuit or a camera CPU, not shown in the figure.

A memory cover 28 for covering a spatial area through which the external memory 40 is attached to and removed from the memory socket 41 (hereinafter, the spatial area is referred to as the memory attachment/removal space S) is swingablly attached to the grip portion 20 via a hinge 28*a*. The memory cover 28 is moved to open and shut the opening of the memory attachment/removal space S. At the edge of the cover 28, a latch hook 28*b* which engages with the inside of the grip portion 20 to lock the memory cover 28 in the shut state is formed.

In this embodiment, of the four main batteries 21 to 24, the first battery 21 (first member) and the fourth battery 24 (second member) are placed apart from each other in the front and back direction (on the lower side and the upper side in FIG. 5) in the grip portion 20, and the memory socket 41 is placed between the first and fourth batteries 21 and 24 so as to extend in the horizontal direction of the grip portion 20. The second battery 22 is placed along the curved surface of the front end of the grip portion 20 in front of the first battery 21. The third battery 23 is placed at the right side of the fourth battery 24, which is the side closer to the image-taking optical axis E.

Further, in the grip portion 20, partitions 20*a* and 20*b* are formed so as to extend along quarter cylindrical surfaces 21*a* and 24*a* of the first and fourth batteries 21 and 24, the surfaces 21*a* and 24*a* facing each other in an area close to the left-outer side of the grip portion 20. These partitions 20*a* and 20*b* extend in an arc shape so that the interspace therebetween widens from the insert slot of the memory socket 41 to the exterior surface of the grip portion 20. Thereby, the memory attachment/removal space S is formed which has a fan-like shape whose width widens from the insert slot of the memory socket 41 to the exterior surface of the grip portion 20.

In this memory attachment/removal space S, an operation button 42 is provided at the top edge of the memory socket 41. To take out the external memory 40, this operation button 42 is pushed in the right direction of the figure (to the side of the image-taking optical axis E). This operation operates an ejecting mechanism (not shown in the figure) which ejects the external memory 40 in the removal direction from its attached position.

With the above structure, the external memory 40 is attached to the memory socket 41 through the memory attachment/removal space S, by being pushed by a photographer's finger 29 from the left side of the grip portion 20.

FIG. 5 shows the state in which the external memory 40 is attached to the memory socket 41. In this state, the operation button 42 protrudes from the insert slot of the memory socket 41 into the memory attachment/removal space S. The edge of the operation button 42 is located at the position closer to the left-outer side of the grip portion 20 by a length of $\Delta x5$ than a line drawn between the two central axes of curvature o and o' of the first and fourth batteries 21 and 24 loaded in the grip portion 20 (the line is shown by the chain line in the figure). This makes the attachment and removal of the external memory 40 by operating the operation button 42 with the finger 29 easier, as will be mentioned later.

Figure 6A:
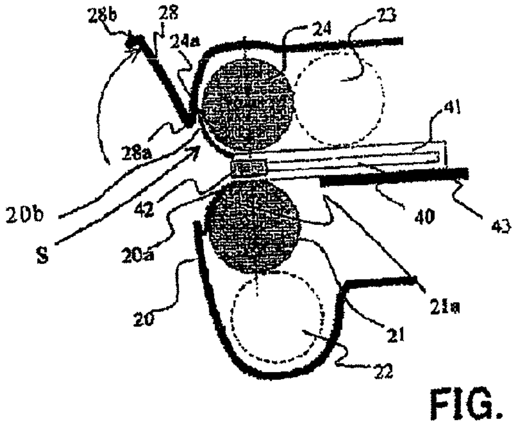
FIG. 6 is a top view showing the cross section of the grip portion when an operation to attach an external memory to the camera is done in Embodiment 2.
Figure 6B:
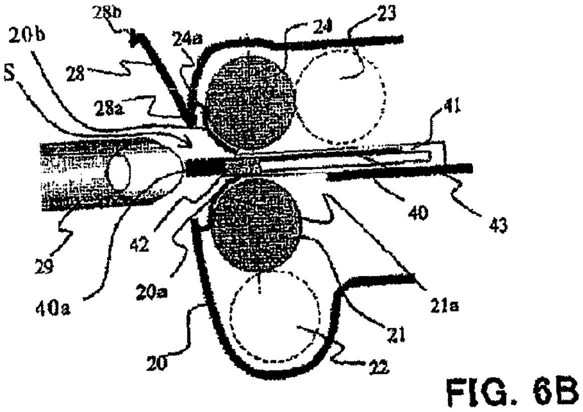
Figure 6C:
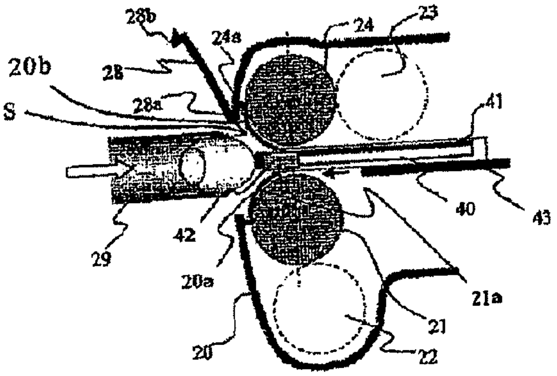
Figure 6D:
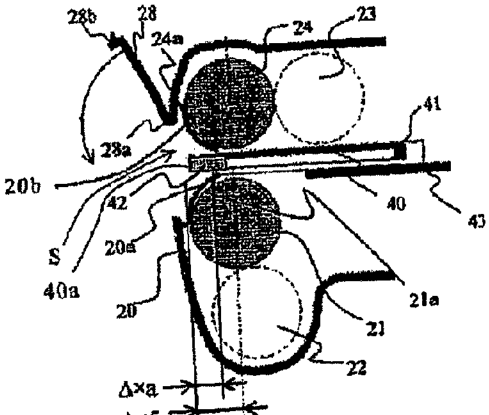

FIGS. 6A to 6D show the operation of attaching the external memory 40 in this embodiment. To attach the external memory 40, the engagement of the latch hook 28*b* of the memory cover 28 should be released to open the memory cover 28 and expose the memory attachment/removal space S (FIG. 6A). Then, the external memory 40 should be inserted into the memory socket 41 through the memory attachment/removal space S (FIG. 6B), and the edge 40*a* of the external memory 40 should be pushed towards the memory socket 41 against the frictional force by a friction material (not shown in the figure) placed inside the memory socket 41 (FIG. 6C). The external memory 40 should be pressed until it is locked (FIG. 6D) by a locking mechanism (not shown in the figure) that is provided in the memory socket 41.

At this point, the operation button 42 protrudes by a length of $\Delta xa$ from its initial position in conjunction with the attachment operation of the external memory 40. The outer edge 40*a* of the external memory 40 also protrudes into the memory attachment/removal space S by a length of $\Delta x5$ when measured from the line drawn between the two central axes of curvature o and o' of the first and fourth batteries 21 and 24 loaded in the grip portion 20 (the line is shown by the chain line). Lastly, the memory cover 28 should be closed to finish the attachment.

Figure 7A:
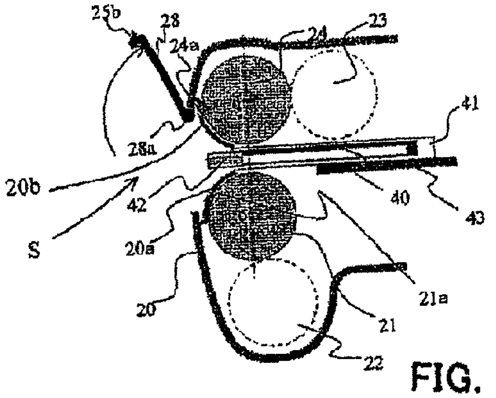
FIG. 7 is a top view showing the cross section of the grip portion when an operation to remove the external memory from the camera is done in Embodiment 2.
Figure 7B:
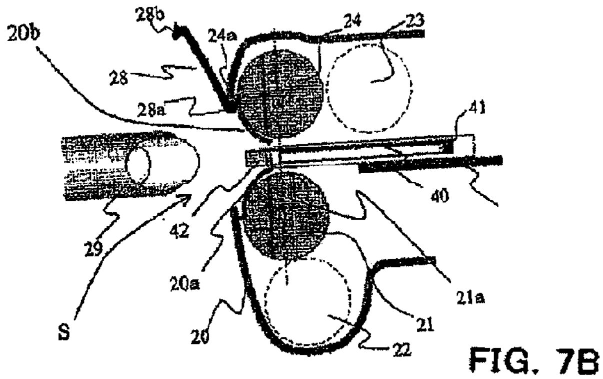
Figure 7C:
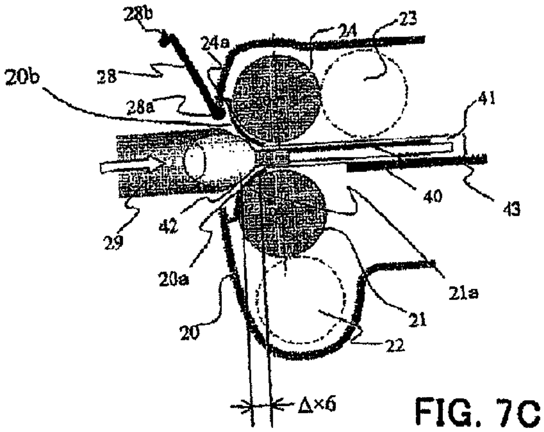
Figure 7D:
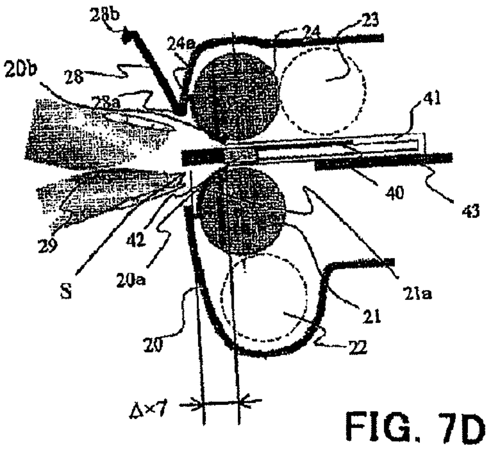

FIGS. 7A to 7D show the operation of removing the external memory 40 in this embodiment. To remove the external memory 40, the engagement between the latch hook 28*b* of the memory cover 28 and the grip portion 20 should be released to open the memory cover 28 and expose the edge of the external memory 40 (FIG. 7A). Then, the finger 29 should be put into the memory attachment/removal space S (FIG. 7B) to push the operation button 42 by a length of $\Delta x6$ (FIG. 7C). By doing so, the ejecting mechanism (not shown in the figure) inside the memory socket 41 operates to eject the external memory 40 left-outward by a length of $\Delta x7$ (FIG. 7D). The external memory 40 can be taken out from the grip portion 20 (camera body 1) with the finger 29 pulling the ejected part of the external memory 40.

In attaching and removing the external memory 40 to and from the memory socket 41, the finger 29 can enter the memory attachment/removal space S comfortably (without interference of the partitions 20*a* and 20*b*) because the partitions 20*a* and 20*b* are formed so that they extend along the quarter cylindrical surfaces 21*a* and 24*a* of the first and fourth batteries 21 and 24 in an arc shape and the interspace therebetween widens towards the left-outer side of the grip portion 20. Therefore, the attachment and removal of the external memory 40 is easy.

In this embodiment, the memory socket 41 is placed between the first battery 21 and the fourth battery 24, but this does not increase the size of the grip portion 20 nor of the camera body 1. In other words, the attachment and removal of the external memory 40 can be facilitated without preventing the minimization of the camera body 1.

Though batteries are used as the members having curved surface portions in this embodiment, any other members having curved surface portions and being placed inside the camera body can be used, which are actuators such as plungers and motors, electric elements such as condensers, or the like.

Embodiment 3

The embodiments 1 and 2 showed layout examples of the four cylindrical shaped batteries and the memory socket. This embodiment will describe about a layout example of a main battery 30 which has a shape that two cylindrical parts are connected as one body, a condenser 31 for flash lighting, and a memory socket 26, as shown in FIG. 8.

Figure 8:
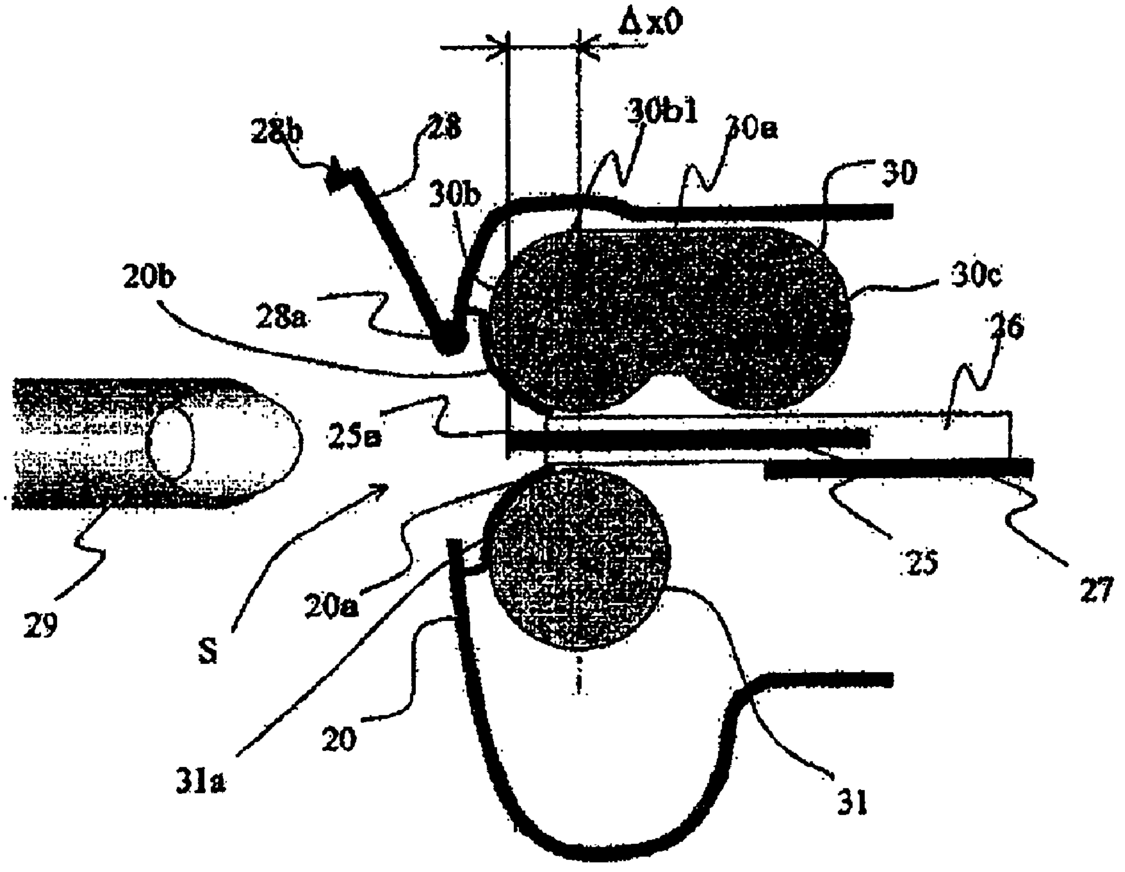
FIG. 8 is a top view showing the cross section of a grip portion of a camera that is Embodiment 3 of the present invention.
Figure 9:
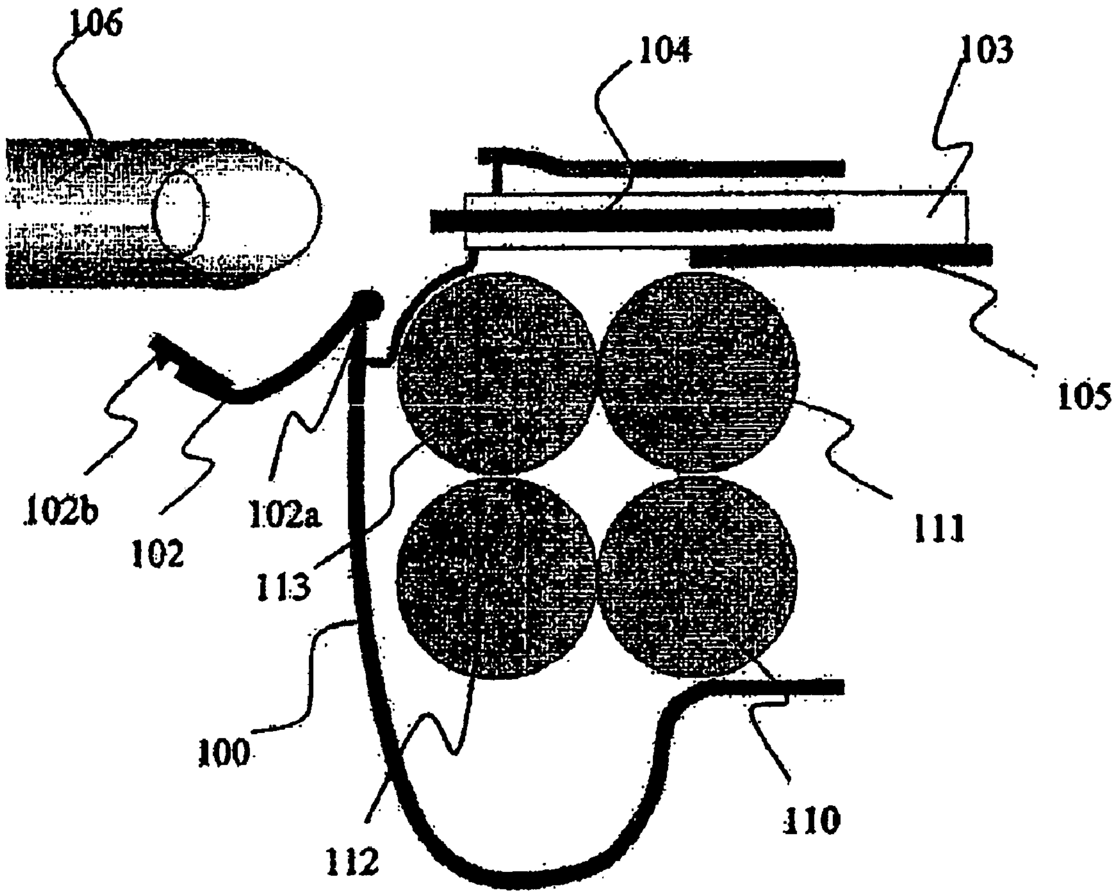
FIG. 9 is a top view showing the cross section of a grip portion of a conventional camera.

FIG. 8 is a top sectional view schematically showing the inside of a grip portion 20 in this embodiment. In FIG. 8, a main battery (first member) 30 and a memory socket (medium attachment part) 26 allowing attachment and removal of an external memory 25, and a condenser (second member) 31 for flash lighting are placed in the grip portion 20. A card type memory such as a semiconductor memory can be used as the external memory 25.

The main battery 30 has two half cylindrical portions 30*b* and 30*c* on the left and right, and also a flat portion 30*a* at the back thereof (the upper side in FIG. 8). The front portion thereof is formed in combination with a flat surface and one-eighth cylindrical surface.

The shape of the condenser 31 is cylindrical. The main battery 30 and the condenser 31 are placed so that the central axis of curvature o (an axis vertical to the paper of FIG. 1) of the peripheral surface, which is a half cylindrical surface, of the half cylindrical portion 30*b* and the central axis of curvature o' of the peripheral surface, which is a cylindrical surface, of the condenser 31 extend parallel to each other in the vertical direction of the grip portion 20. The main battery 30 can be loaded in and removed from the grip portion 20 from the bottom thereof, not shown in the figure. The condenser 31 is fixed inside the grip portion 20.

Other structure is the same as that in Embodiment 1. The common components are designated with the same reference numerals as in Embodiment 1 to replace the description thereof. In this embodiment, partitions 20*a* and 20*b* are formed so as to extend along a quarter cylindrical surface 30*b*1 of the half cylindrical portion 30*b* of the battery 30 and a quarter cylindrical surface 31*a* of the condenser 31, the quarter cylindrical surfaces 30*b*1 and 31*a* facing each other in an area close to the left-outer side of the grip portion 20. These partitions 20*a* and 20*b* extend in an arc shape so that the interspace therebetween widens from the insert slot of the memory socket 26 to the exterior surface of the grip portion 20. Thereby, the memory attachment/removal space S is formed which has a fan-like shape whose width widens from the insert slot of the memory socket 26 to the exterior surface of the grip portion 20.

With the above structure, the external memory 25 is inserted into the memory socket 26 through the memory attachment/removal space S by being pushed by a photographer's finger 29 from the left side of the grip portion 20.

FIG. 8 shows the position of the external memory 25 attached to the memory socket 26. In this state, a part of the external memory 25 protrudes from the insert slot into the memory attachment/removal space S. In addition, the protruding edge 25*a* of the external memory 25 is located at the position closer to the left-outer side of the grip portion 20 by a length of Δxo than a line drawn between the two central axes of curvature o and o' of the quarter cylindrical surfaces (cylindrical surfaces) 30*b*1 and 31*a* of the main battery 30 and condenser 31. The line is shown by the chain line. This makes the attachment and removal of the external memory 25 by the finger 29 easy, as in Embodiment 1.

In each of the above-mentioned embodiment, the curved surface portions of the two members, which are placed so as to sandwich a space near the insert slot of the memory socket in the direction of the thickness of the memory socket, forms the fan-like memory attachment/removal space S widening from the insert slot of the memory socket towards the exterior of the camera body. This provides a good operability for attaching and removing the external memory to and from the memory socket, without increasing the size of the camera body (the grip portion). Also, providing the fan-like shaped memory attachment/removal space S between the exterior surface of the camera body and the memory socket is effective in dust prevention of the memory socket.

As described above, according to each of the embodiments, a medium attachment part is placed between the first and second members, and an attachment/removal space for attaching and removing a memory medium is formed so as to widen towards the outside of the apparatus body along the curved surface portions of the first and second members. This allows easier attachment and removal of the memory medium without increasing the size of the apparatus body, and also enhances flexibility of the apparatus body design.

The description of the above embodiments involves digital single lens reflex cameras, the present invention, however, can be applied to various electronic apparatuses such as mobile terminals, as well as image-taking apparatuses such as lens-integrated digital cameras and video cameras.

This application claims a benefit of priority based on Japanese Patent Application No. 2005-141868, filed on May 13, 2005, which is hereby incorporated by reference herein in its entirety as if fully set forth herein.

What is claimed is:

1. An electronic apparatus comprising:

an apparatus body which accommodates first and second members each having a curved surface portion so that the central axes of curvature of the curved surface portions extend parallel to each other; and a medium attachment part to which a memory medium is removably attached, wherein, in a state in which the first and second members are accommodated inside the apparatus body, the medium attachment part is placed between the first and second members, wherein a direction in which the memory medium is attached to and removed from the medium attachment part is a direction orthogonal to the central axes of curvature of the curved surface portions, and wherein an attachment/removal space through which the memory medium is attached to and removed from the medium attachment part is formed so as to widen towards the outside of the apparatus body along the curved surface portions of the first and second members.

2. The electronic apparatus according to claim 1, wherein the memory medium is attached to the medium attachment part so that, in the attachment/removal space, a part of the memory medium is located closer to the outside of the apparatus body than a line extending between the central axes of curvature of the first and second members accommodated inside the apparatus body.

3. The electronic apparatus according to claim 1, wherein the medium attachment part includes an ejecting mechanism to eject the attached memory media towards the outside of the apparatus body, and in the attachment/removal space an operation portion for operating the ejecting mechanism is located closer to the outside of the apparatus body than a line extending between the central axes of curvature of the first and second members accommodated inside the apparatus body.

4. The electronic apparatus according to claim 1, wherein at least one of the first and second members has a cylindrical surface or a partial cylindrical surface as the curved surface portion.

5. The electronic apparatus according to claim 1, wherein at least one of the first and second members is a battery.

6. The electronic apparatus according to claim 1, wherein at least one of the first and second members is a motor.

7. The electronic apparatus according to claim 1, wherein at least one of the first and second members is a condenser.

8. The electronic apparatus according to claim 1, wherein the first and second members and the medium attachment part are placed inside a grip portion of the apparatus body.

9. The electronic apparatus according to claim 1, wherein the electronic apparatus is an image-taking apparatus including an image-pickup device and a circuit to record images acquired by the image-pickup device.

* * * * *